July 28, 1964 L. C. COVINGTON 3,142,308
LIQUID SEAL VACUUM VALVE
Filed Dec. 12, 1960
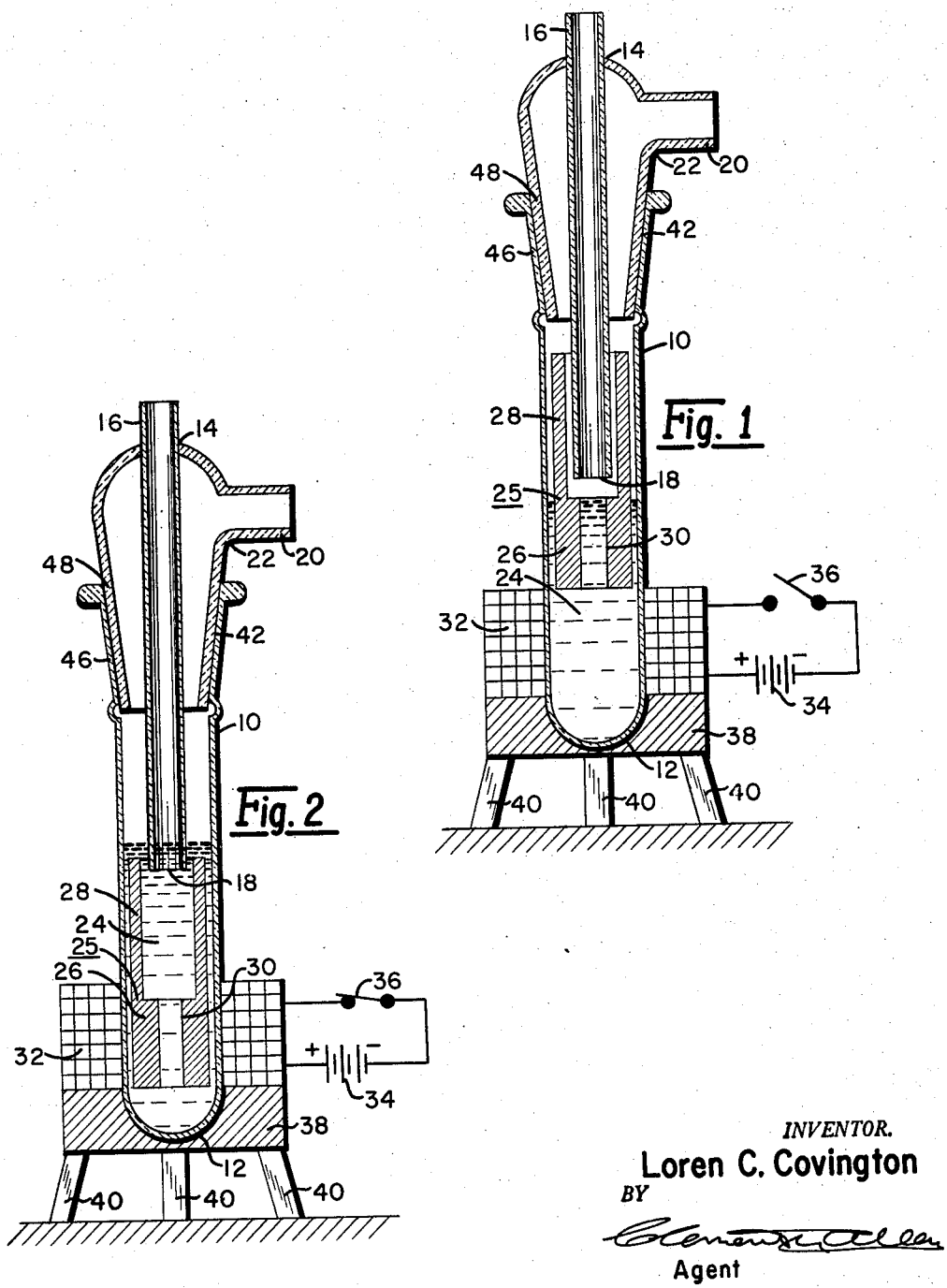
INVENTOR.
Loren C. Covington
BY
Agent

United States Patent Office 3,142,308
Patented July 28, 1964

3,142,308
LIQUID SEAL VACUUM VALVE
Loren C. Covington, Henderson, Nev., assignor to Titanium Metals Corporation of America, New York, N.Y., a corporation of Delaware
Filed Dec. 12, 1960, Ser. No. 75,202
1 Claim. (Cl. 137—253)

This invention relates to a valve, and more particularly to a valve useful in vacuum apparatus.

Valves for use in apparatus operated under vacuum must necessarily be readily operated and leak proof. Various conventional types of valves such as stopcocks and plug valves depend on external mechanical actuation, and such mechanisms are difficult if not impossible to make completely tight against leakage. In addition, lubricants employed with plug type valves or stopcocks often contaminate the interior of apparatus in which such valves are employed.

Valves employing liquid mercury for sealing and operation have been heretofore proposed, but the design of valves employing liquid sealants has not provided efficient operation. In such valves, mercury is at times blown out to contaminate other parts of the apparatus.

It is therefore a principal object of this invention to provide an improved valve for use in vacuum apparatus. A further object of this invention is to provide a leak proof valve. Yet another object of this invention is to provide a completely sealed valve having no mechanical external elements for actuation thereof. These and other objects of this invention will be apparent from the annexed drawings in which:

FIG. 1 shows a vertical section of a valve embodying features of this invention, such valve being in the open position.

FIG. 2 shows a similar vertical section of the valve of FIG. 1 but with the valve in closed position.

Referring now to FIG. 1 the valve comprises a vertical hollow housing 10 having a closed bottom as at 12. Transfixing the top of housing 10 as at 14 and intruding downardly into the housing 10 is a connector tube 16 having an open bottom as at 18. Connector tube 16 intrudes a distance so that the open bottom 18 thereof is disposed at a point intermediate the bottom and top of housing 10 and spaced apart from the sidewall thereof. A second connector tube 20 projects outwardly from the housing 10 near its top as at 22, and communicates with the interior of the housing 10. Preferably the housing 10 as well as connector tubes 16 and 20 are fabricated of glass.

Contained in the lower portion of housing 10 is a body of mercury 24, and floating and partially submerged in the body of mercury 24 is a float 25 made at least in part of magnetic material, preferably composed as shown of a lower body portion 26 and an upper tubular portion 28. The upper portion 28 of the float 25 slides freely up and down in the space between the exterior surface of connector tube 16 and the interior opposite surface of the wall of housing 10. Preferably the body portion 26 of the float 25 is provided with a central bore which, as will be seen in FIGS. 1 and 2, provides a central passageway of diameter less than the internal diameter of the tubular upper portion 30. The float 25, at least in part and preferably the body portion 26 thereof, should be fabricated of magnetic material such as a ferrous metal, for example, iron or steel.

Normally the float 25 remains partially submerged at a level in the body of mercury 24 depending on its size and specific gravity. Means are arranged exterior of housing 10 to further submerge the float 25 in the body of mercury 24 and in the embodiment illustrated, such means comprise solenoid coil 32 which surrounds a lower part of housing 10 and means for intermittent energization thereof, which comprise an electric current source such as battery 34 connected thereto through switch 36. The bottom of housing 10 and the solenoid 32 may be suitably supported by a base comprising cradle block 38 and suitable legs 40 attached thereto.

Preferably, for ease of construction and assembly, and also for occasional dismantling, housing 10 may be constructed with a separable joint as at 42. This joint 42 may be formed by providing a slightly tapered female ground glass section 46 at the uppermost portion of the lower part of the housing 10 sidewall, and into which is carefully fitted a corresponding ground glass male portion as at 48 at the lowermost portion of the upper part of the housing 10 sidewall. A suitable conventional sealing composition such as stopcock grease may be interposed between the ground surfaces of the upper and lower joint elements during assembly and when these are firmly engaged the joint will be leak proof and semipermanent.

In operation of the valve of this invention the connector tubes 16 and 20 can be considered the inlet and outlet to the valve body itself formed by the housing 10, and it is immaterial which connector tube is employed as the outlet and which is employed as the inlet. Therefore, these connector tubes will be suitably connected as desired into the piping through which it is desired to control the flow. The physical dimensions and construction design of the float as well as the volume of the body of mercury, and the location of the open bottom 18 of the vertical connector tube 16 will be arranged so that when the float is normally floating in the body of mercury the connector tube bottom is open to the interior housing 10 as will be apparent from FIG. 1.

When switch 36, however, is closed, solenoid 32 is energized creating a magnetic field which attracts the float downwardly into the lower position shown more clearly in FIG. 2. The downward displacement of the float into the body of mercury causes a rise in the mercury level in the housing 10 and the mercury now submerges the open bottom end of connector tube 16 and seals this element. With the bottom of connector tube 16 thus sealed by the higher level of mercury the valve is closed. Opening switch 36 releases the float from magnetic influence generated by solenoid 32 and it then floats normally again in the body of mercury, the mercury level drops below the end 18 of connector tube 16, and thus the valve is opened.

The valve of this invention is useful for controlling gas flow in apparatus operated under vacuum. It may, for example, be employed in apparatus for determining oxygen in metals as described in U.S. Patent No. 2,964,389. Under such conditions of operation the pressure of the gas flow to be controlled is usually not very great, and a relatively small head of mercury above the open bottom 18 of connector tube 16, when the valve is closed, will be adequate under most circumstances. This mercury head may be of the order of a few milliliters of mercury more or less. Sometimes, however, in operation of such a valve, excess gas pressure may inadvertently or intentionally be allowed to be present on one side of the closed valve with the result that the mercury head will not be sufficient for sealing and the valve will be forcibly opened. This will result in a blow-by of gas through the valve. It is a unique feature of the valve of this invention that a blow-by will not ordinarily carry globules or particles of mercury into other parts of the apparatus. Depending on whether the connector tube 16 or the connector tube 20 is arranged as the inlet or outlet of the valve, when a blow-by occurs, globules or particles of mercury may be either blown up for some distance into the interior of connector tube 16 or upwardly inside housing 10. Due to the vertical arrangement of the elements, however, any mercury blown up into connector tube 16 or housing 10 will collect on the interior side walls thereof and will simply drain back down into the bottom of housing 10 and recombine with the main body of mercury 24.

The preferred construction of the valve of this invention wherein the housing 10 is formed of two sections joined by a ground glass tapered joint, as at 42, and as particularly illustrated in FIG. 1 and FIG. 2, provides a simple yet effective construction. The joint 42 may be effectively sealed and thus be permanent or semi-permanent over a long period of use. The joint 42, however, may be readily disconnected, for example, for original filling of the housing with the required body of mercury, and also provides means for disassembly of the valve for periodic cleaning or other purposes. Since the body of mercury 24 in the bottom of housing 10 is relatively heavy, tension on the joint 42 is relieved by provision of supporting block 38 so that the valve assembly including the joint may be properly maintained without possibility of accidental separation. Support block 38 also functions as a support for solenoid coil 32, which surrounds the bottom of housing 10 and is also inherently relatively heavy.

I claim:

A valve comprising; a vertical, hollow glass housing having a permanently closed bottom, said housing comprising a bulbous upper section and a lower section jointed by a tapered ground glass joint, a base supporting the bottom of said housing, an open-bottom connector tube transfixing the top of said housing and intruding downwardly into said housing to a location intermediate the top and bottom thereof, a second connector tube communicating with and projecting outwardly from said housing near the top thereof, a body of mercury contained in the bottom portion of said housing, a float aligned with said open-bottom connector tube at least in part of magnetic metal floating and partially submerged in said body of mercury, and magnetic means external of said housing operable to intermittently further submerge said float, the volume of said body of said mercury and the displacement of said float and the location of the open bottom of said downwardly intruding connector tube being arranged so that when the float is floating in the body of mercury the said connector tube bottom is open to the interior of said housing, and when the said float is further submerged in said body of mercury in response to operation of said external magnetic means the said mercury will rise in said housing and seal the bottom of said connector tube.

References Cited in the file of this patent

UNITED STATES PATENTS 2,658,519     Sagady _____ Nov. 10, 1953

FOREIGN PATENTS 46,326     Austria _____ Feb. 10, 1911
496,814     Great Britain _____ Dec. 7, 1938
1,033,935     Germany _____ July 10, 1958